US008275769B1

(12) United States Patent
Suh et al.

(10) Patent No.: US 8,275,769 B1
(45) Date of Patent: Sep. 25, 2012

(54) SYSTEM AND METHOD FOR IDENTIFYING USERS RELEVANT TO A TOPIC OF INTEREST

(75) Inventors: Bongwon Suh, Cupertino, CA (US); Kevin Robert Canini, San Francisco, CA (US); Peter L. Pirolli, San Francisco, CA (US); Ed H. Chi, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/087,308

(22) Filed: Apr. 14, 2011

(51) Int. Cl.
*G06F 17/30* (2006.01)
(52) U.S. Cl. ...................................... 707/732; 705/319
(58) Field of Classification Search .................... None
See application file for complete search history.

(56) References Cited

U.S. PATENT DOCUMENTS

| | | | |
|---|---|---|---|
| 2008/0162157 A1* | 7/2008 | Daniluk | 705/1 |
| 2009/0006388 A1* | 1/2009 | Ives et al. | 707/5 |
| 2009/0112989 A1* | 4/2009 | Anderson et al. | 709/204 |
| 2010/0094869 A1* | 4/2010 | Ebanks | 707/732 |
| 2010/0131489 A1* | 5/2010 | Goldman-Shenhar et al. | 707/710 |
| 2011/0106895 A1* | 5/2011 | Ventilla et al. | 709/206 |
| 2011/0270774 A1* | 11/2011 | Varshavsky et al. | 705/319 |
| 2011/0320423 A1* | 12/2011 | Gemmell et al. | 707/706 |

OTHER PUBLICATIONS

"JetStream: Achieving Predictable Gossip Dissemination by Leveraging Social Network Principles," by Patel et al. IN: 5th IEEE Int'l Sympos. on Network Computing and Applications (2006). Available at: ACM.*
"Combinational collaborative filtering for personalized community recommendation," by Chen et al. IN: Proc. of the 14th ACM SIGKDD Int'l Conf. on Knowledge Discovery and Data Mining (2008). Available at: ACM.*
"Social Network Mining with Nonparametric Relational Models," by Xu et al. IN: Lecture Notes in Computer Science, 2010, vol. 5498/2010, 77-96. Available at: SpringerLink.*
Blei et al., "Latent Dirichlet Allocation," Journal of Machine Learning Research, vol. 3, pp. 993-1022 (Jan. 2003).
Jansen et al., "Twitter Power: Tweets as Electronic Word of Mouth," Journal of the American Society for Information Science and Technology, vol. 60, No. 11, pp. 2169-2188 (2009).
Java et al., "Why We Twitter: Understanding Microblogging Usage and Communities," Proceedings of the 9th WebKDD and 1st SNA-KDD 2007 Workshop on Web Mining and Social Network Analysis, pp. 56-65 (2007).
Kwak et al., "What is Twitter, a Social Network or a News Media?" Proceedings of the 19th International World Wide Web Conference, pp. 591-600 (Apr. 26-30, 2010).
Rieh et al., "Credibility: A Multidisciplinary Framework," Annual Review of Information Science and Technology, vol. 41, No. 1, pp. 307-364 (2007). Weng et al., "TwitterRank: Finding Topic-Sensitive Influential Twitterers," Proceedings of the Third ACM International Conference on Web Search and Data Mining, pp. 261-270 (Feb. 4-6, 2010).
Chen et al., "Short and Tweet: Experiments on Recommending Content from Information Streams," CHI 2010: Proceedings of the 28th International Conference on Human Factors in Computing Systems, pp. 1185-1194 (Apr. 10-15, 2010).

* cited by examiner

*Primary Examiner* — Neveen Abel Jalil
*Assistant Examiner* — Daniel Kinsaul
(74) *Attorney, Agent, or Firm* — Patrick J. S. Inouye; Krista A. Wittman

(57) ABSTRACT

A system and method for identifying users relevant to a topic of interest is provided. A query comprising one or more topics is executed against a corpus of messages. Voting users associated with the messages matching the query are identified. A set of candidate users comprising users connected to the voting users is generated. A relevancy score is computed for each candidate user. The candidate users are ranked by their respective relevancy score.

24 Claims, 4 Drawing Sheets

SYSTEM AND METHOD FOR IDENTIFYING USERS RELEVANT TO A TOPIC OF INTEREST

FIELD

This application relates in general to management of electronic information and, in particular, to a system and method for identifying users relevant to a topic of interest.

BACKGROUND

A growing amount of information is shared through social networking websites, such as Facebook and Twitter. Initially, these types of websites were used mainly as a way to keep in touch with friends and family by sharing personal information such as status updates and uploaded photographs. Currently, social media tools are increasingly utilized for purposes beyond personal conversations, including public discourse in diverse areas, including politics, business, technology, and pop culture, as well as professional networking Information is transferred via a relationship, or connection, such as "friending" in Facebook and "following" in Twitter. For example, Twitter is a social networking and microblogging service that allows users to send and receive short messages, known as "tweets", and to share and discover various topics of interest in real-time. To receive another user's tweets, a user must subscribe to, or "follow", the other user's tweets. To receive high-quality information about a topic of interest, a user has to identify credible users whose tweets are relevant to the topic. A user is found credible based at least in part on both the expertise of the user and the trust other users have in the user, reflected in the number of followers the user has.

As there are currently over 100 million registered users of Twitter, finding the credible, or otherwise valuable, users who publish information on a regular basis can be difficult as there are no simple or efficient ways to determine which users are relevant to particular topics of interest. Twitter has introduced lists whereby users can organize the users they follow, "followees," into groups. Third party services, such as Listorious, available at listorious.com, and MyTwitterCloud, available at mytwittercloud.com, use the created Twitter lists to index popular users based on their membership in other users' lists. The list assignments are aggregated and used to generate a ranking of users for a given tag. However, user ranking is based on the manually provided users lists, which have not been widely adopted, leading to an under representation of potential credible users. Moreover, the list categories are arbitrarily chosen by a user, which means that the topics associated with a user can be arbitrary as well, and may not reflect the actual topic of credibility of a user in the list.

Additionally, WeFollow, available at wefollow.com, allows a user to self-associate with a keyword of choice, which is then used to rank the user against other uses who have opted-in for the same keyword. However, a user has to manually opt-in to be included on a list, which means many credible sources may not be represented in the list for the particular keyword or topic. Like Listorious and MyTwitterCloud, a user may be arbitrarily associated with a particular typographical instantiation of a keyword or topic. For example, a user may associate with the term "photography" but, in turn, may be weakly associated with the term "photographer."

Accordingly, there is a need for leveraging the existing social structure to identify relevant users associated with a particular topic of interest.

SUMMARY

An embodiment provides a system and method for identifying users relevant to a topic of interest. A query comprising one or more topics is executed against a corpus of messages. Voting users associated with the messages matching the query are identified. A set of candidate users comprising users connected to the voting users is generated. A relevancy score is computed for each candidate user. The candidate users are ranked by their respective relevancy score Still other embodiments of the invention will become readily apparent to those skilled in the art from the following detailed description, wherein are embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

Figure 1:
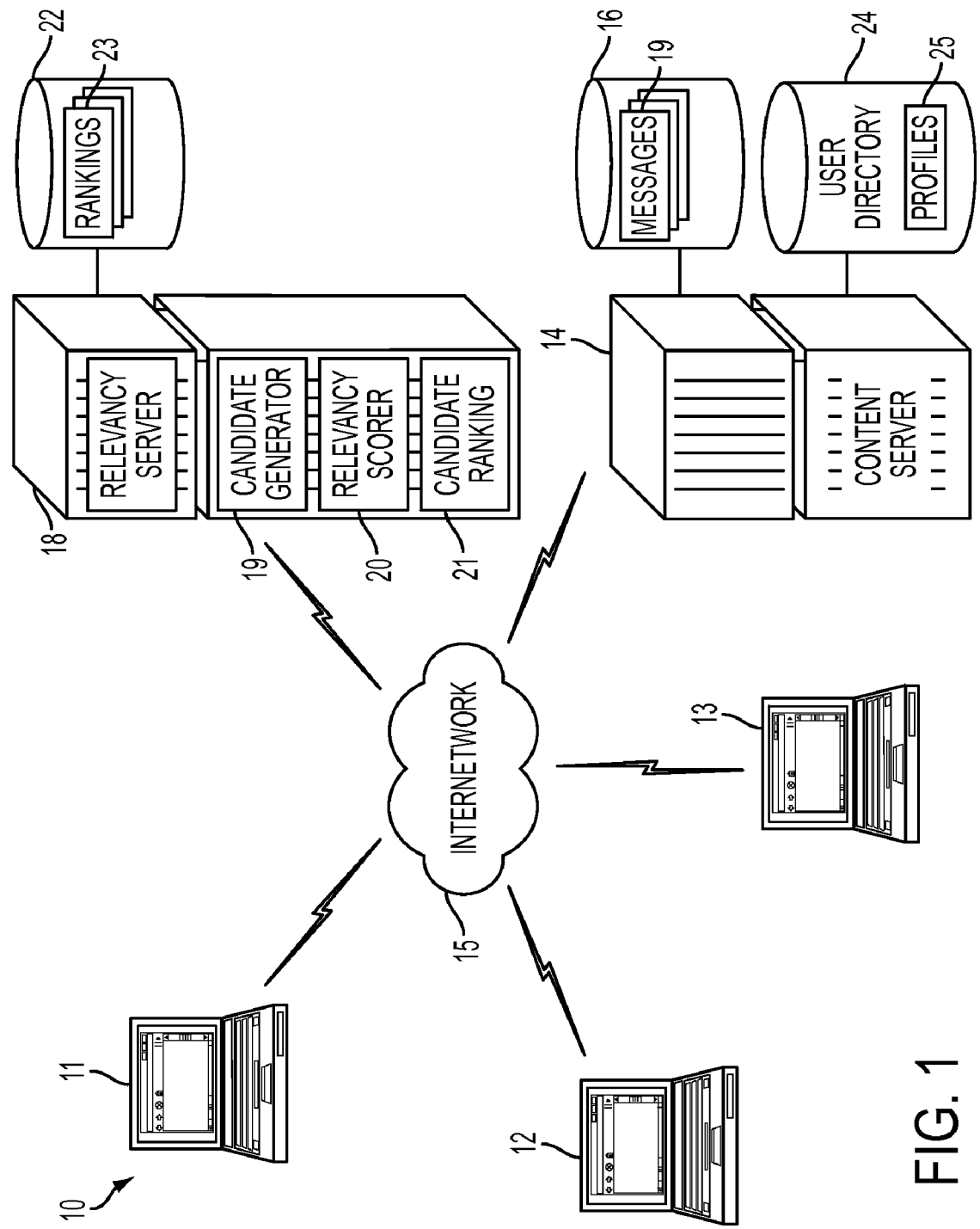
FIG. 1 is a block diagram showing a system for identifying users relevant to a topic of interest, in accordance with one embodiment.

As valuable knowledge is increasingly shared through social networks, identifying credible users who are highly relevant to a particular topic of interest becomes more difficult. Providing an automated ranking of the most interesting or relevant users relevant to a topic greatly minimizes the time and effort required by a user to identify other users worth connecting to. FIG. 1 is a block diagram showing a system 10 for identifying users relevant to a topic of interest, in accordance with one embodiment. One or more user devices 11-13 are connected to a content server 14 via an Internetwork 15, such as the Internet. The user devices 11-13 can include a computer, laptop, or mobile device, such as a cellular telephone or mobile Internet device (not shown). In general, each user device 11-13 is a Web-enabled device that executes a Web browser, which supports interfacing tools and information exchange with the content server 14.

The content server 14 is interconnected to a content database 16 and a user database 24. The content database 16 stores messages 17, which are provided to the user devices 11-13 upon request. The user database 24 stores user profiles 25, such as user name, password, and connections between users. Other types of data are possible. In a further embodiment, messages 17 and user profiles 25 can be stored locally on the user devices 11-13.

A user inputs a search query of one or more keywords or topics and the query is executed against the messages 19 in the content database 16 via the content server 14. Messages 19 are created by users or automatically generated, and can include status updates from networking sites, such as Facebook and Twitter, emails, blog postings, forums, and news content. Other types of messages 19 are possible. Messages 19 can be queried and the results received directly on user devices 11-13, for user review via a user interface from the content server 14, through a application programming interface of the message source, such as the Twitter API, or messages 19 from many sources can be aggregated, cached, and accessed by user devices 11-13 from other servers 18.

Subsequently, a relevancy server 18 generates a ranking of users relevant to the search query. The relevancy server 18 is interconnected to the user devices 11-13 and the content server 14 via the internetwork 15, and includes a candidate generator module 19, relevancy scorer module 20, and candidate ranking module 21.

The candidate generator module 19 generates, a set of candidate users. The candidate users are generated from a combination of the user generated search query of the messages 19 in the message database 16 and the social connections between users. For example, social networks include features to connect with other users, such as family, friends, colleagues, and strangers. Facebook has "friending" and Twitter has "following." Users connect to one another to keep updated with messages posted by other users. The messages can include, for example, status updates, weblinks, and photos.

The relevancy scorer module 20 applies a relevancy measure to the candidate users and determines a relevancy score for each candidate. The relevancy score of each candidate user is compared and the candidates are ranked 23 based on the score. The rankings 23 can be cached for later retrieval or update in the relevancy database 22. Users can then select one or more of the ranked users to connect to, such a by following or friending the user.

The user devices 11-13, relevancy server 18, and content server 14 each include components conventionally found in general purpose programmable computing devices, such as a central processing unit, memory, input/output ports, network interfaces, and non-volatile storage, although other components are possible.

Further, the user devices 11-13, relevancy server 18, and content server 14 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
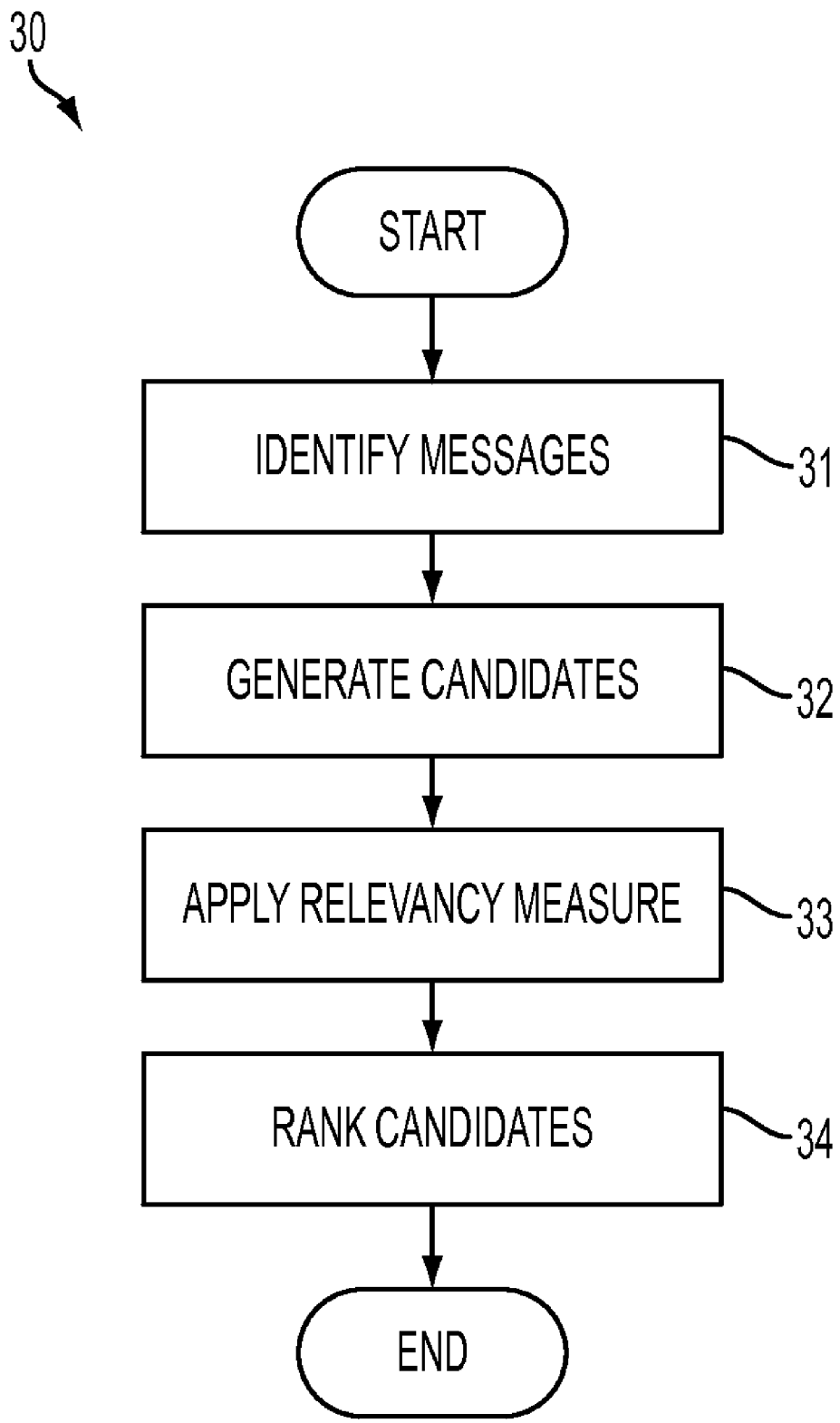
FIG. 2 is a flow diagram showing a method for identifying users relevant to a topic of interest, in accordance with one embodiment.

Users relevant to a topic of interest are identified from content of user messages and social connections between users. FIG. 2 is a flow diagram 30 showing a method for identifying users relevant to a topic of interest, in accordance with one embodiment. A search query is received from a user and applied to a corpus of messages 16 and the messages 19 satisfying the query are identified (block 31). In one embodiment, various linguistics, such as word stemming, synonym expansion, and spelling corrections can be applied to the search query The query can be applied to all messages 19 or to only those messages 19 within a specified time window. The time period can be manually chosen by the user or automatically determined. For example, the time window may be all messages 19 received since the last time the user used the system 10, those that have been received in the last hour, or only the most recent number n messages. Other time windows are possible. The query can be applied directly to the messages through the content server 14, through an application programming interface of the message source, such as the Twitter API, through the relevancy server 18, or messages 19 from many sources can be aggregated, cached, and accessed by user devices 11-13 from other servers.

Figure 3:
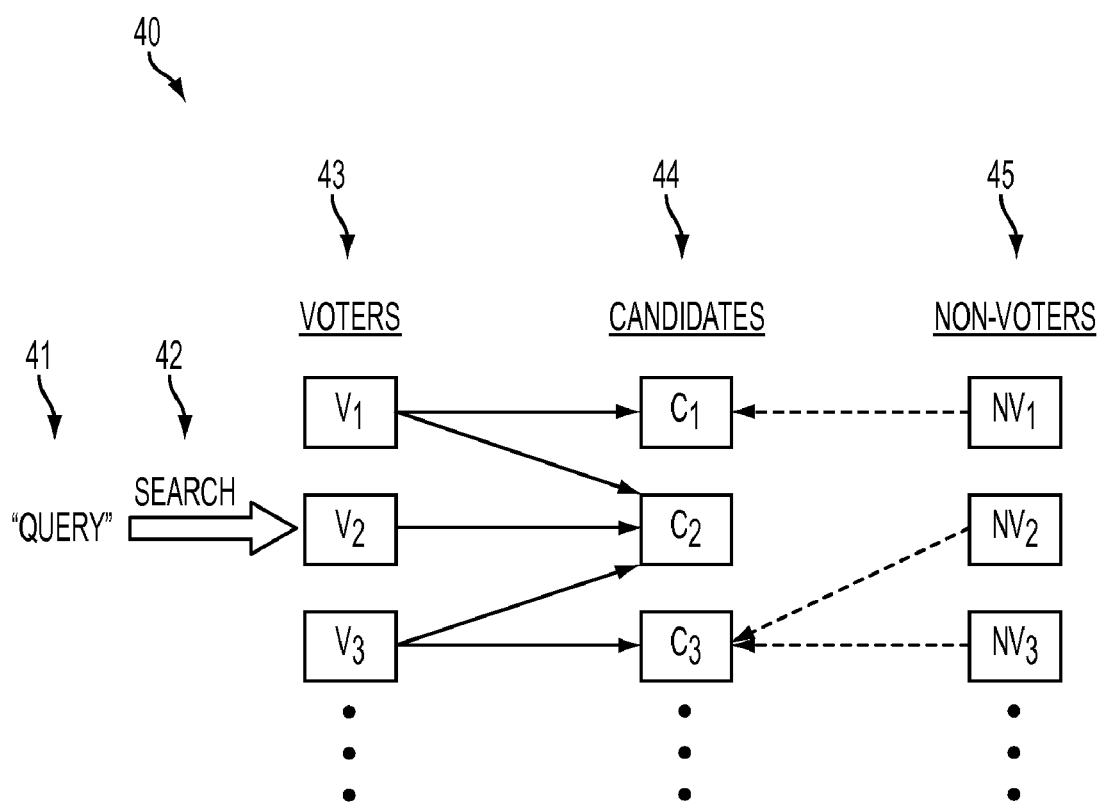
FIG. 3 is a data flow diagram showing, for example, a method for generating candidate users for use in the method of FIG. 2.

Candidate users that may be relevant to the query are generated from the identified messages (block 32), as further discussed below with reference to FIG. 3. Briefly, the users connected to the users whose messages satisfy the query are identified as candidate users. The uses can be connected through, for example, social links such as "friends" on Facebook or "following" on Twitter. Other connections between users are possible.

Candidate users are identified from other users who follow their message streams. FIG. 3 is a data flow diagram 40 showing, for example, a method for generating candidate users for use in the method of FIG. 2. A query 41 is received from a user of the system 10. The query 41 can include one or more keywords or terms. The query is applied to the corpus through a search 42 for messages matching the query or a subset of the query 41. In one embodiment, the query results include all messages that match the query. In a further embodiment the query results only include a subset of the entire results, such as described above with reference to FIG. 2. For example, only the most recent 1,500 messages that include the query will be returned. Confining results to the most recent messages increases the ability to adapt to temporal trends in messages 19. When the semantics of a query changes over time, the result generated by the system 10 can track the most recent meaning of the query. For example, a query term "election" can have multiple semantics depending on when the term is used. Near an U.S. presidential election, "election" maybe strongly associated with "presidential election" while "election" may be more related to gubernatorial or senate elections when used close to a midterm election.

Users whose message content satisfies the query are identified, placed in a voter user set, and designated as voter users 43. The social connections of the voter users 43 are analyzed and the users who are connected to the voter users 43 are identified as candidate users 44. For each candidate user 44, the number, $f_u$, of voter users 43 who are connected to the candidate user 44 is determined. Additionally, the total number of users, $F_u$, who are connected to each candidate user 44 is determined by combining the number of voter users 43 and non-voter users 45 for each candidate user 44. For example, candidate user $C_1$, has a $f_u$ value of 1, since the only voter user connected to $C_1$ is $V_1$, while $C_1$ has a $F_u$ of 2 since $NV_1$ is connected to $C_1$ as well. Candidate users $C_2$ and $C_3$ have $f_u$ scores of 3 and 1, and $F_u$ scores of 3 and 3, respectively. The numbers $f_u$ and $F_u$ are then used to determine a relevancy score for each candidate user 44, as further described below with reference to FIG. 4.

Figure 4:
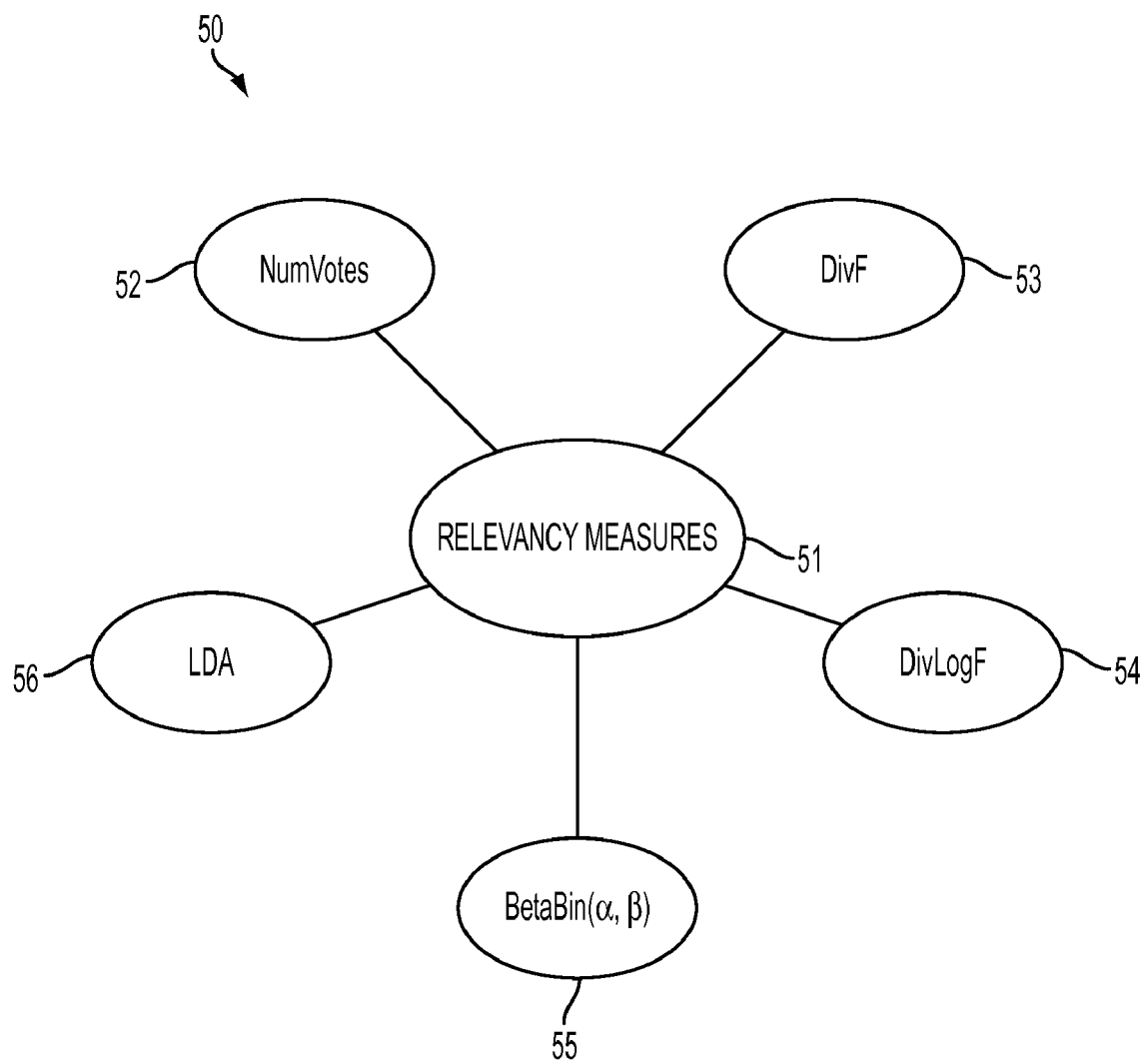
FIG. 4 is data flow diagram showing, for example, types of relevancy measures.

Returning to the above discussion with respect to FIG. 2, a relevancy measure is then applied to each of the candidate users to determine a relevancy score (block 33), as further described below with reference to FIG. 4. The relevancy scores of the candidate users are then compared and the candidate users ranked (block 34) based on the relevancy scores. The ranking is displayed to the querying user, who can then select one or more candidate users to connect to, for example "following" or "friend".

A relevancy measure is applied to determine a ranking of each candidate user to a topic of interest. FIG. 4 is data flow diagram 50 showing, for example, types of relevancy measures 51. Relevancy measures 51 can include NumVotes 52, DivF 53, DivLogF 54, BetaBin($\alpha$, $\beta$) 55, and latent Dirichlet allocation (LDA) 56. Other relevancy measures are possible. NumVotes 52 counts the number of voter users who follow a particular candidate user u. Each voter user casts a vote for each of their social connections, such as followees, and the total number determined, $f_u$, is the relevancy score for user u.

In some circumstances, NumVotes 52 can overly favor the most popular users who may not be relevant to the topic of interest. For example, some Twitter users have over one million followers and would likely return many voting users for any search query. Therefore, DivF 53 counts the proportion, rather than the actual number, of a user's followers, who satisfied the search query. A higher proportion of a user's followers who are associated with a topic, the more relevant that user should be to the topic of the query. DivF 53 is determined according to the equation $f_u/F_u$.

DivF 53 may overpenalize generally popular users and underpenalize unpopular users in some situations, and can be overly sensitive to spuriously large values of $f_u$ when $F_u$ is small. DivLogF 54 provides a balance between the NumVotes 52 and DivF 53 relevancy measures. DivLogF 54 is determined according to the equation $f_u/\log F_u$. DivLogF 54 generates values between NumVotes 52 and DivF 53, balancing between the two measures. However, DivLogF 54, in some circumstances, may not properly penalize generally popular users.

BetaBin($\alpha$, $\beta$) 55 properly penalizes generally popular users without underpenalizing unpopular users. BetaBin($\alpha$, $\beta$) 55 is probability based. Each candidate user's followers is assumed to be randomly included in the voter user set independently of one another and with probability p, and $f_u$ is then approximated by a Binomial($F_u$, p) binomial probability distribution. Next a Beta($\alpha$, $\beta$3) prior distribution over p is used, so that after observing $f_u$ of the user's $F_u$ followers occurring in the voter users set, the posterior probability of p follows a Beta($f_u+\alpha$, $F_u+\beta$) distribution. The expected value of the posterior distribution gives an estimate, E, of the probability that each of the user's followers is to be part of the voter user set, after observing the values of $f_u$ and $F_u$. The posterior expected value is determined according to the equation:

$$E[p|f_u,F_u]=(f_u+\alpha)/(F_u+\alpha+\beta)$$

which defines the BetaBin($\alpha$, $\beta$) 55 relevancy measure.

Since the proportion of a user's followers within the voter user set is expected to be low on average, $\alpha$ is set so that $\alpha<<\beta$. For example, $\alpha$ is set to 1, while $\beta$ is given values such as $10^2$, $10^3$, or $10^4$. Other values for $\alpha$ and $\beta$ are possible.

Additionally, the BetaBin($\alpha$, $\beta$) 55 relevancy measure functions similar to the NumVotes 41 measure when F<<$\alpha$+$\beta$, since $(f_u+\alpha)/(F_u+\alpha+\beta) \approx f_u+\alpha)/(\alpha+\beta) \sim f_u$. Further, BetaBin ($\alpha$, $\beta$) 44 functions similar to the DivF 42 measure when F>>a+B, since $(f_u+\alpha)/(F_u+\alpha+\beta) \approx f_u/F_u$. Therefore, BetaBin ($\alpha$, $\beta$) 55 has the benefit of measuring the proportion of a user's followers who are in the voter user set, like DivF 53, while also appropriately penalizing unpopular users like the NumVotes 52 measure.

Unlike NumVotes 52, DivF 53, DivLogF 54, BetaBin($\alpha$, $\beta$) 55, which take into account information about the link structure of the social network between the users, the LDA measure 56 takes into account the overall content, or topics, of users' messages as well. Candidate users are still determined from the voter user set, such as described above in FIG. 3. A topic model is built to associate each user, and associated message, with one or more topics. The entire message histories of the candidate users are collected and the LDA measure 56 is run on the messages. The LDA results provide a way of determine the topical similarity of any user to a search query based on the content of the user's tweets.

The LDA measure 56 analysis first begins by collecting all messages made by a user into a document. Each user is represented by the aggregation of messages they have created. Next, the parameters for the LDA analysis are chosen. The number of topics, k, is empirically chosen, and is generally between 200 and 1,000 topics, though other topic numbers are possible. In one embodiment, the number of topics is set to 500. Parameters alpha and beta for the Dirichlet kernel are empirically chosen as well and are set to 0.1 and 0.5 respectively. Finally, the LDA algorithm, such as described in D. M. Blei et al., "Latent Dirichlet Allocation," 3 Jour. Of Machine Learning Research 993-1022 (2003), the disclosure of which is incorporated herein by reference, is applied on the set of documents to obtain the two sets, $P_1$ and $P_2$, of topical distribution. $P_1$(query term|topic$_k$) is the probability distribution of terms for each topic, where k is the number of topics. $P_2$(topic$_k$|user$_i$) is the probability distribution of topics for each document, which is an aggregation of messages by a user, where i is the number of users.

Given the two probability distributions, $P_1$ and $P_2$ the topical similarity between query terms and a user can be calculated as the probability that the user would generate the query terms, which is according to the equation:

$$\text{Score}_{LDA}(\text{user}_i) = \sum_k P_1(queryterm|\text{topic}_k) * P_2(\text{topic}_k|\text{user}_i)$$

The candidates are then ranked based on the results. In a further embodiment, LDA can be applied to one of the link structure-based measures that has been applied to re-rank the candidate users, using topic similarity to the search query as the ranking criterion. For example, the two scores for ranking can he combined according to the equation:

$$\text{Score}_{Combined}=W_{LinkStructure}*\text{Score}_{LinkStructure}+W_{LDA}*\text{Score}_{LDA,}$$

where Score$_{LinkStructure}$ equals one of NumVotes 52, DivF 53, DivLogF 54, or BetaBin($\alpha$, $\beta$), Score$_{LDA}$ equals the LDA determination, and 0<$W_{LinkStructure}$, $W_{LDA}$<1 and $W_{LinkStructure}+W_{LDA}=1$.

Other content-based algorithms can be used, for example, probabilistic latent semantic analysis, latent semantic indexing, hierarchical LDA, and explicit semantic analysis.

While the invention has been particularly shown and described as referenced to the embodiments thereof, those skilled in the art will understand that the foregoing and other changes in form and detail may be made therein without departing from the spirit and scope of the invention.

What is claimed is:

1. A system for identifying users relevant to a topic of interest, comprising:
   a query module to execute a query comprising one or more topics against a corpus of messages and to identify voting users associated with the messages matching the query;

a candidate generator module to generate a set of candidate users comprising users connected to the voting users;

a relevancy scorer module to compute a relevancy score for each candidate user in accordance with:

$$E[p|f_u,F_u]=(f_u+\alpha)/(F_u+\alpha+\beta)$$

where E is an estimated probability p, $f_u$, is a number of the voting users connected to the candidate user, $F_u$ is a total number of users comprising the voting users and non-voting users connected to the candidate user, and $\alpha$ and $\beta$ are binomials;

a candidate ranking module to rank the candidate users by their respective relevancy score; and a processor to execute the modules.

2. A system according to claim 1, further comprising:

a topic module to identify one or more messages associated with each candidate user and to apply a topic model to the identified messages for that candidate user; and a re-ranking module to re-rank the candidate users based on the topic model.

3. A system according to claim 2, wherein the topic model is determined according to the equation:

$$Score_{LDA}(user_i) = \sum_k P_1(queryterm|topic_k) * P_2(topic_k|user_i)$$

where $P_1$(query term|$topic_k$) is a probability distribution of terms for each topic, k is a number of the topics, $P_2$($topic_k$|$user_i$) is a probability distribution of the topics for each document comprising the identified messages of the candidate user, and i is the number of users.

4. A system according to claim 2, wherein the re-ranking is determined according to the equation:

$$Score_{Combined}=W_{LinkStructure}*Score_{LinkStrucctture}+W_{LDA}*Score_{LDA},$$

where $Score_{LinkStructure}$ equals the relevancy score, $Score_{LDA}$ equals the topic model, and $0<W_{LinkStructure}$, $W_{LDA}<1$ and $W_{LinkStructure}+W_{LDA}=1$.

5. A system according to claim 1, further comprising:

a time window module to determine a time window and to apply the query against the messages in the corpus that were created within the time window.

6. A method for identifying users relevant to a topic of interest, comprising:

executing a query comprising one or more topics against a corpus of messages;

identifying voting users associated with the messages matching the query;

generating a set of candidate users comprising users connected to the voting users;

computing a relevancy score for each candidate user in accordance with:

$$E[p|f_u,F_u]=(f_u+\alpha)/(F_u+\alpha+\beta)$$

where E is an estimated probability p, $f_u$, is a number of the voting users connected to the candidate user, $F_u$ is a total number of users comprising the voting users and non-voting users connected to the candidate user, and a and are binomials; and ranking the candidate users by their respective relevancy score.

7. A method according to claim 6, further comprising:

identifying one or more messages associated with each candidate user;

applying a topic model to the identified messages; and re-ranking the candidate users based on the topic model.

8. A method according to claim 7, wherein the topic model is determined according to the equation:

$$Score_{LDA}(user_i) = \sum_k P_1(queryterm|topic_k) * P_2(topic_k|user_i)$$

where $P_1$(query term|$topic_k$) is a probability distribution of terms for each topic, k is a number of the topics, $P_2$($topic_k$|$user_i$) is a probability distribution of the topics for each document of comprising the identified messages of the candidate user, and i is the number of users.

9. A method according to claim 7, wherein the re-ranking is determined according to the equation:

$$Score_{Combined}=W_{LinkStructure}*Score_{LinkStructure}+W_{LDA}*Score_{LDA},$$

where $Score_{LinkStructure}$ equals the relevancy score, and $0<W_{LinkStructure}$, $W_{LDA}<1$ and $W_{LinkStructure}+W_{LDA}=1$.

10. A method according to claim 6, further comprising:

determining a time window; and applying the query against the messages in the corpus that were created within the time window.

11. A system for identifying users relevant to a topic of interest, comprising:

a query module to execute a query comprising one or more topics against a corpus of messages and to identify voting users associated with the messages matching the query;

a candidate generator module to generate a set of candidate users comprising further users connected to the voting users;

a relevancy scorer module to determine a relevancy score for each candidate user, comprising:

a topic module to build a topic model to associate each candidate user and associated message with one or more topics; and a relevancy calculation module to compute the relevancy score in accordance with:

$$Score_{LDA}(user_i) = \sum_k P_1(queryterm|topic_k) * P_2(topic_k|user_i)$$

where $P_1$(query term|$topic_k$) is a probability distribution of terms for each topic, k is a number of the topics, $P_2$($topic_k$|$user_i$) is a probability distribution of the topics for each message of one of the users, and i is a number of the users;

a candidate ranking module to rank the candidate users by their respective relevancy score; and a processor to execute the modules.

12. A system according to claim 11, wherein the number of topics k comprises a number between 200 and 1,000 topics.

13. A method for identifying users relevant to a topic of interest, comprising:

executing a query comprising one or more topics against a corpus of messages and to identify voting users associated with the messages matching the query;

generating a set of candidate users comprising further users connected to the voting users;

determining a relevancy score for each candidate user, comprising:

building a topic model to associate each candidate user and associated message with one or more topics; and computing the relevancy score in accordance with:

$$Score_{LDA}(user_i) = \sum_k P_1(queryterm \mid topic_k) * P_2(topic_k \mid user_i)$$

where $P_1(query\ term \mid topic_k)$ is a probability distribution of terms for each topic, k is a number of the topics, $P_2(topic_k \mid user_i)$ is a probability distribution of the topics for each message of one of the users, and i is a number of the users; and ranking the candidate users by their respective relevancy score.

14. A method according to claim 13, wherein the number of topics k comprises a number between 200 and 1,000 topics.

15. A system for identifying users relevant to a topic of interest, comprising:
   a query module to execute a query comprising one or more topics against a corpus of messages and to identify voting users associated with the messages matching the query;
   a candidate generator module to generate a set of candidate users comprising further users connected to the voting users;
   a relevancy scorer module to compute a relevancy score for each candidate user;
   a candidate ranking module to rank the candidate users by their respective relevancy score;
   a topic module to identify one or more messages of each candidate user and to apply a topic model to the identified messages;
   a re-ranking module to re-rank each candidate user based on the topic model in accordance with:

$$Score_{Combined} = W_{LinkStructure} * Score_{LinkStructure} + W_{LDA} * Score_{LDA},$$

where $Score_{LinkStructure}$ equals the relevancy score, $Score_{LDA}$ equals the topic model, and $0 < W_{LinkStructure}$, $W_{LDA} < 1$ and $W_{LinkStructure} + W_{LDA} = 1$; and
   a processor to execute the modules.

16. A system according to claim 15, further comprising:
   a calculation module to calculate a number of the voting users for each candidate user and to calculate a number of total users comprising the voting users and non-voting users connected to each candidate user.

17. A system according to claim 16, wherein the relevancy score is determined according to an equation $f_u$, where $f_u$ is the number of voting users connected to the candidate user.

18. A system according to claim 16, wherein the relevancy score is determined according to an equation $f_u/F_u$, where $f_u$ is the number of voting users connected to the candidate user and $F_u$ is the total number of users connected to the candidate user.

19. A system according to claim 16, wherein the relevancy score is determined according to the equation $f_u/F_u$, where $f_u$ is the number of voting users connected to the candidate user and $F_u$ is the total number of users connected to the candidate user.

20. A method for identifying users relevant to a topic of interest, comprising:
   executing a query comprising one or more topics against a corpus of messages and to identify voting users associated with the messages matching the query;
   generating a set of candidate users comprising further users connected to the voting users;
   computing a relevancy score for each candidate user;
   ranking the candidate users by their respective relevancy score;
   identifying one or more messages of each candidate user and to apply a topic model to the identified messages; and
   re-ranking each candidate user based on the topic model in accordance with:

$$Score_{Combined} = W_{LinkStructure} * Score_{LinkStructure} + W_{LDA} * Score_{LDA},$$

where $Score_{Linkstructure}$ equals the relevancy score, $Score_{LDA}$ equals the topic model, and $0 < W_{LinkStructure}$, $W_{LDA} < 1$ and $W_{LinkStructure} + W_{LDA} = 1$.

21. A method according to claim 20, further comprising:
   calculating a number of the voting users for each candidate user; and
   calculating a number of total users comprising the voting users and non-voting users connected to each candidate user.

22. A method according to claim 21, wherein the relevancy score is determined according to an equation $f_u$, where $f_u$ is the number of voting users connected to the candidate user.

23. A method according to claim 21, wherein the relevancy score is determined according to an equation $f_u/F_u$, where $f_u$ is the number of voting users connected to the candidate user and $F_u$ is the total number of users connected to the candidate user.

24. A method according to claim 21, wherein the relevancy score is determined according to an equation $f_u/\log F_u$, where $f_u$ is the number of voting users connected to the candidate user and $F_u$ is the total number of users connected to the candidate user.

* * * * *